(12) United States Patent
Yamashita et al.

(10) Patent No.: US 6,269,923 B1
(45) Date of Patent: Aug. 7, 2001

(54) LOCKUP DEVICE OF TORQUE CONVERTER

(75) Inventors: Kazuhiro Yamashita; Mitsugu Yamaguchi, both of Osaka (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/497,208

(22) Filed: Feb. 3, 2000

(30) Foreign Application Priority Data

Feb. 17, 1999 (JP) .................................................. 11-038563

(51) Int. Cl.[7] .................................................. F16H 45/02
(52) U.S. Cl. .......................................... 192/3.29; 192/213
(58) Field of Search ............................... 192/3.28, 3.29, 192/212, 213

(56) References Cited

U.S. PATENT DOCUMENTS

| | | | |
|---|---|---|---|
| 5,682,972 | * 11/1997 | Sasada | 192/213 |
| 5,772,515 | * 6/1998 | Yamakawa et al. | 192/3.29 X |
| 5,810,140 | * 9/1998 | Billet et al. | 192/3.29 |
| 5,868,228 | * 2/1999 | Fukushima | 192/3.29 |

FOREIGN PATENT DOCUMENTS

| | | |
|---|---|---|
| 38 08 804 | 9/1988 | (DE) . |
| 197 11 518 | 11/1997 | (DE) . |
| 197 52 395 | 5/1998 | (DE) . |
| 2 123 924 | 2/1984 | (GB) . |
| 88/05511 | 9/1988 | (WO) . |

\* cited by examiner

Primary Examiner—Charles A. Marmor
Assistant Examiner—Saúl Rodriguez
(74) Attorney, Agent, or Firm—Shinjyu Global IP Counselors, LLP (57) ABSTRACT

A lockup device 6 is provided for a torque converter 1 that allows for the use of larger torsion springs 50. The lockup device 6 of the torque converter 1 includes a piston 8 and a damper mechanism 13. The piston 8 constitutes a clutch together with a front cover 3. The damper mechanism 13 includes a drive plate 9, a driven plate 10 and coil spring assemblies 12. The drive plate 9 is secured to one axial side surface of the piston 8. The coil spring assemblies 12 couple the drive plate 9 and the driven plate 10 in a rotational direction. Cutouts 41 are formed in the drive plate 9 at positions corresponding to positions of the coil spring assemblies 12. Each coil spring assembly 12 is received within the corresponding one of the cutout 41 and is axially supported by the one axial side surface of the piston 8.

11 Claims, 5 Drawing Sheets

LOCKUP DEVICE OF TORQUE CONVERTER

BACKGROUND OF THE INVENTION

1. Field of the Invention

This invention generally relates to a lockup device of a torque converter. More specifically, the present invention relates to a lockup device of a torque converter for mechanically transmitting torque from an input rotatable body to an output rotatable body of a torque converter and absorbing and dampening torsional vibrations transmitted from the input rotatable body to the output rotatable body.

2. Background Information

Torque converters usually include a fluid coupling mechanism for transmitting torque between the crankshaft of an engine and the input shaft of an automatic transmission. A torque converter has three types of runners (impeller, turbine, stator) located inside for transmitting the torque by means of an internal hydraulic oil or fluid. The impeller is fixedly coupled to the front cover that receives the input torque from the power input shaft. The hydraulic chamber formed by the impeller shell and the front cover is filled with hydraulic oil. The turbine is disposed opposite the front cover in the hydraulic chamber. When the impeller rotates, the hydraulic oil flows from the impeller to the turbine, and the turbine rotates. As a result, the torque is transmitted from the turbine to the main drive shaft of the transmission.

Generally, a torque converter can perform smooth acceleration and deceleration because it transmits a power via fluid. However, an energy loss occurs due to slip of the fluid, resulting in low fuel consumption.

Accordingly, in recent years to improve fuel efficiency, some of the conventional torque converters have included a lockup device for mechanically coupling a front cover on an input side and a turbine on an output side. Specifically, the lockup device is disposed in a space between the front cover and the turbine. When the torque converter reaches predetermined operating conditions, the lockup device of the torque converter causes power from the crankshaft of an engine to be directly transmitted to the automatic transmission, and thus, bypassing the fluid coupling device.

Such lockup devices typically include a disk-like piston, a retaining plate, torsion springs and a driven member. The disk-like piston is connectable to the front cover. The retaining plate is secured to an outer peripheral section of the piston. The torsion springs are supported by the retaining plate in a rotational direction and at the outer peripheral side of the retaining plate. The driven member supports the opposing ends of each torsion spring in a rotational direction. The driven member is secured to a turbine shell or a turbine hub of the turbine.

As the lockup device is activated, torque is transmitted from the front cover to the piston and then to the turbine through the torsion springs. Furthermore, as the torque fluctuations are transmitted from an engine to the lockup device, the torsion springs are compressed between the retaining plate and the driven member in the damper mechanism, such that torsional vibrations are absorbed and dampened. In other words, the damper mechanism functions as a torsional vibration dampening mechanism to dampen vibration in the lockup clutch.

The piston carries an annular friction member adhered to a position opposed to a flat friction surface of the front cover. The piston is disposed to divide the space between the front cover and the turbine into a first hydraulic chamber on the front cover side and a second hydraulic chamber on the turbine side. As a result, the piston can move close to and away from the front cover by the pressure difference between the first hydraulic chamber and the second hydraulic chamber. When the hydraulic oil in the first hydraulic chamber is drained and the hydraulic pressure in the second hydraulic chamber increases in pressure, the piston moves toward the front cover side. This movement of the piston causes the piston to strongly press against the front cover.

In the conventional lockup device, the operation of the piston is controlled by the working fluid flowing through the main unit of the torque converter. More specifically, a hydraulic operation mechanism in an external position supplies the working fluid to a space between the piston and the front cover when the lockup device is disengaged. This working fluid flows radially outward through the space between the front cover and the piston, and then flows from its radially outer portion into the main unit of the torque converter. When the lockup device is engaged, the working fluid in the space between the front cover and the piston is drained from its radially inner portion so that the piston moves toward the front cover. Thereby, the friction member arranged on the piston is pressed against the friction surface of the front cover. In this manner, the torque of the front cover is transmitted to the turbine via the lockup device.

There is an increasing demand for higher performance damper mechanisms. The demand dictates for damper mechanisms that can be utilized at lower vehicle speeds and higher torque levels. In a recently introduced torque converter, torque is transmitted through fluid only as acceleration commences from a standstill. Furthermore, a lockup device of the recently introduced torque converter is operated as vehicle speed reaches, for example, 10 km/h or higher. In such torque converter constructions having a wider lockup range, there is a strong demand for higher torsion spring performance in order to absorb and dampen torsional vibrations resulting from torque fluctuations transmitted from the engine. Specifically, there is a demand for damper mechanisms with larger diametric torsion springs that can better absorb and dampen torsional vibrations.

However, in the prior lockup devices, the piston and the retaining plate are arranged on one axial side of each torsion spring. Therefore, it is not allowed to increase a size of the torsion spring sufficiently. Furthermore, the lockup device is arranged in an axially restricted space within the torque converter.

In view of the above, there exists a need for a lockup device of a torque converter which overcomes the above mentioned problems in the prior art. This invention addresses this need in the prior art as well as other needs, which will become apparent to those skilled in the art from this disclosure.

SUMMARY OF THE INVENTION

It is an objective of the present invention to allow use of larger torsion springs in a lockup device of a torque converter.

A lockup device defined in accordance with a first aspect of the present invention is used in a torque converter that preferably includes a front cover, an impeller and a turbine. The front cover has a friction surface on its inner side. The impeller defines a hydraulic fluid chamber together with the front cover. The turbine is opposed to the impeller within the hydraulic fluid chamber and provides a space between the turbine and the front cover. The lockup device is preferably arranged in the space between the front cover and the turbine. The lockup device mechanically couples or uncouples the front cover and the turbine in accordance with pressure changes within the space. The lockup device preferably includes a piston and a damper mechanism. The piston is movable within the space in accordance with the pressure changes within the space. The piston is preferably arranged adjacent to the friction surface of the front cover. The damper mechanism resiliently couples the piston and the turbine in a rotational direction. The damper mechanism preferably includes a drive plate, a driven plate and one or more torsion springs. The drive plate is secured to one axial side surface of the piston. The driven plate is non-rotatably engaged with the turbine. The torsion springs couple the drive plate and the driven plate in a rotational direction. A cutout is formed in the drive plate at positions corresponding to a position of respective torsion springs. The torsion springs are axially supported by the one axial side surface of the piston within the respective cutouts.

In such a lockup device of a torque converter, torque from the front cover is transmitted to the damper mechanism through the piston while the piston is coupled with the friction surface of the front cover. In the damper mechanism, this torque is preferably and sequentially transmitted through the drive plate, the torsion springs and the driven plate. The torque is then transmitted from the driven plate to the turbine. Furthermore, as the torsional vibrations are transmitted from the front cover to the lockup device, the torsion springs are compressed between the drive plate and the driven plate in a rotational direction. During this compression, the torsion springs slide along the one axial side of the piston within the corresponding cutouts of the drive plate.

As described above, the cutouts are formed in the drive plate of the lockup device. The presence of the cutouts makes possible an increase of each torsion spring diameter corresponding to the relational thickness of the drive plate. Such an increase was not possible in the corresponding torsion springs of prior art lockup devices.

The lockup device in accordance with a second aspect of the present invention is the lockup device according to the first aspect, wherein the driven plate supports both circumferential ends of the torsion springs. The torsion springs are preferably supported in a manner that allows axial movement of the piston, the drive plate and the torsion springs relative to the driven plate.

A lockup device defined in accordance with a third aspect of the present invention is used in a torque converter that preferably includes a front cover, an impeller and a turbine. The front cover preferably has a friction surface on its inner side. The impeller defines a hydraulic fluid chamber together with the front cover. The turbine is opposed to the impeller within the hydraulic fluid chamber and provides a space between the turbine and the front cover. The lockup device is arranged in the space and mechanically couples or uncouples the front cover and the turbine in accordance with pressure changes within the space. The lockup device includes a plate member and a damper mechanism. Torque from the front cover can be transmitted to the plate member. The damper mechanism resiliently couples the plate member and the turbine in a rotational direction. The damper mechanism preferably includes a drive plate, a driven plate and at least one torsion spring. The drive plate is secured to one axial side surface of the plate member. The driven plate is non-rotatably engaged with the turbine. The torsion springs couple the drive plate and the driven plate in a rotational direction. One or more cutouts are formed in the drive plate at a position or positions corresponding to the position or positions of respective torsion spring or springs. Each torsion spring is axially supported by the one axial side surface of the plate member within the respective cutout.

In such a lockup device of a torque converter, torque from the front cover is transmitted to the damper mechanism through the plate member while the plate member is coupled with the friction surface of the front cover. In the damper mechanism, this torque is sequentially transmitted through the drive plate, the torsion springs and the driven plate. The torque is then transmitted from the driven plate to the turbine. Furthermore, as the torsional vibrations are transmitted from the front cover to the lockup device, the torsion springs are compressed between the drive plate and the driven plate in a rotational direction. During this stage, the torsion springs slide along the one axial side of the plate member within the corresponding cutouts of the drive plate.

As described above, the cutouts are formed in the drive plate of the lockup device. The presence of the cutouts makes an increase of each torsion spring diameter corresponding to the relational thickness of the drive plate possible. Such an increase was not possible in the corresponding torsion springs of prior art lockup devices.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
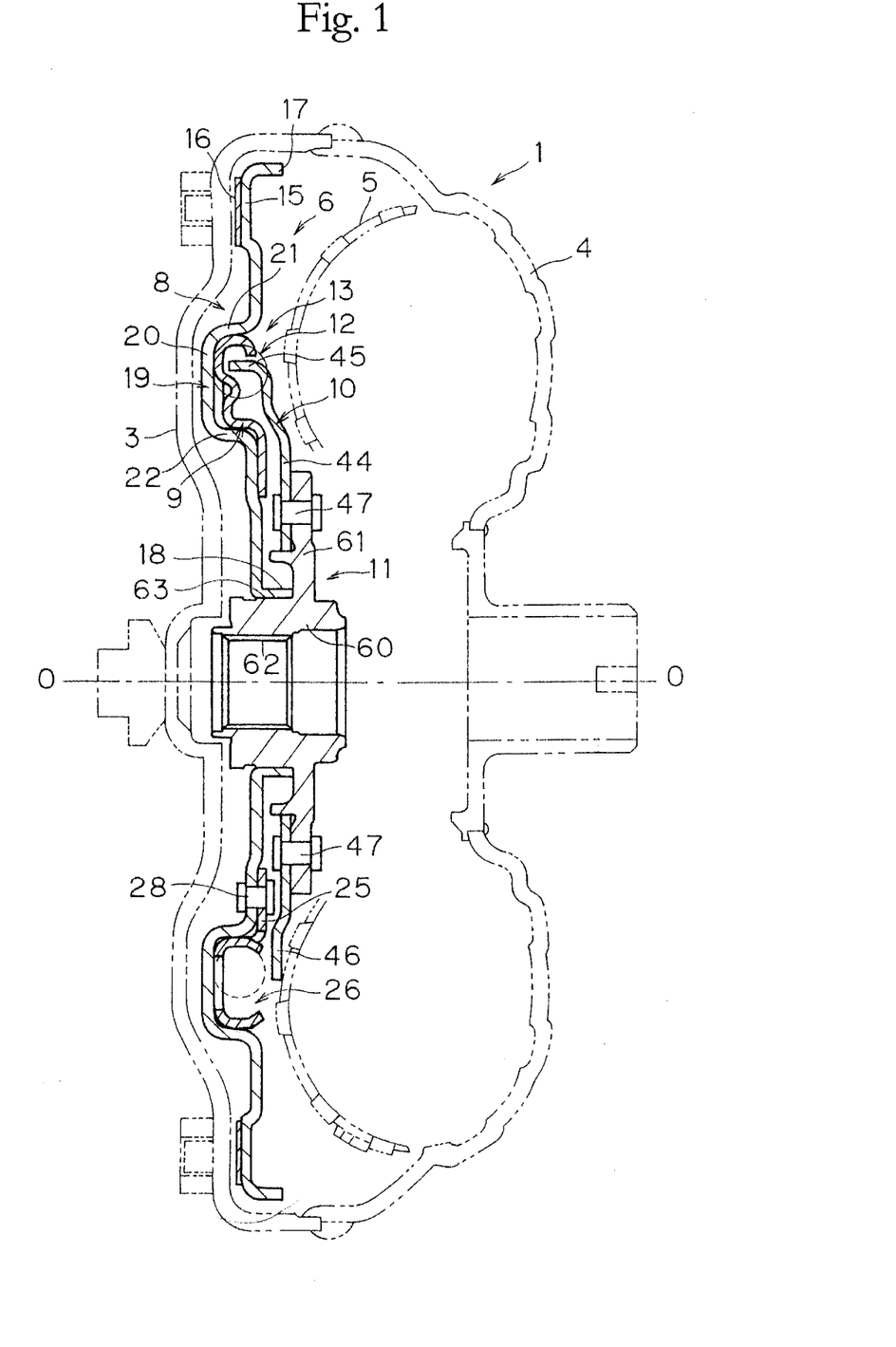
FIG. 1 is a simplified longitudinal cross-sectional view of a torque converter with a lockup device in accordance with an embodiment of the present invention.
Figure 2:
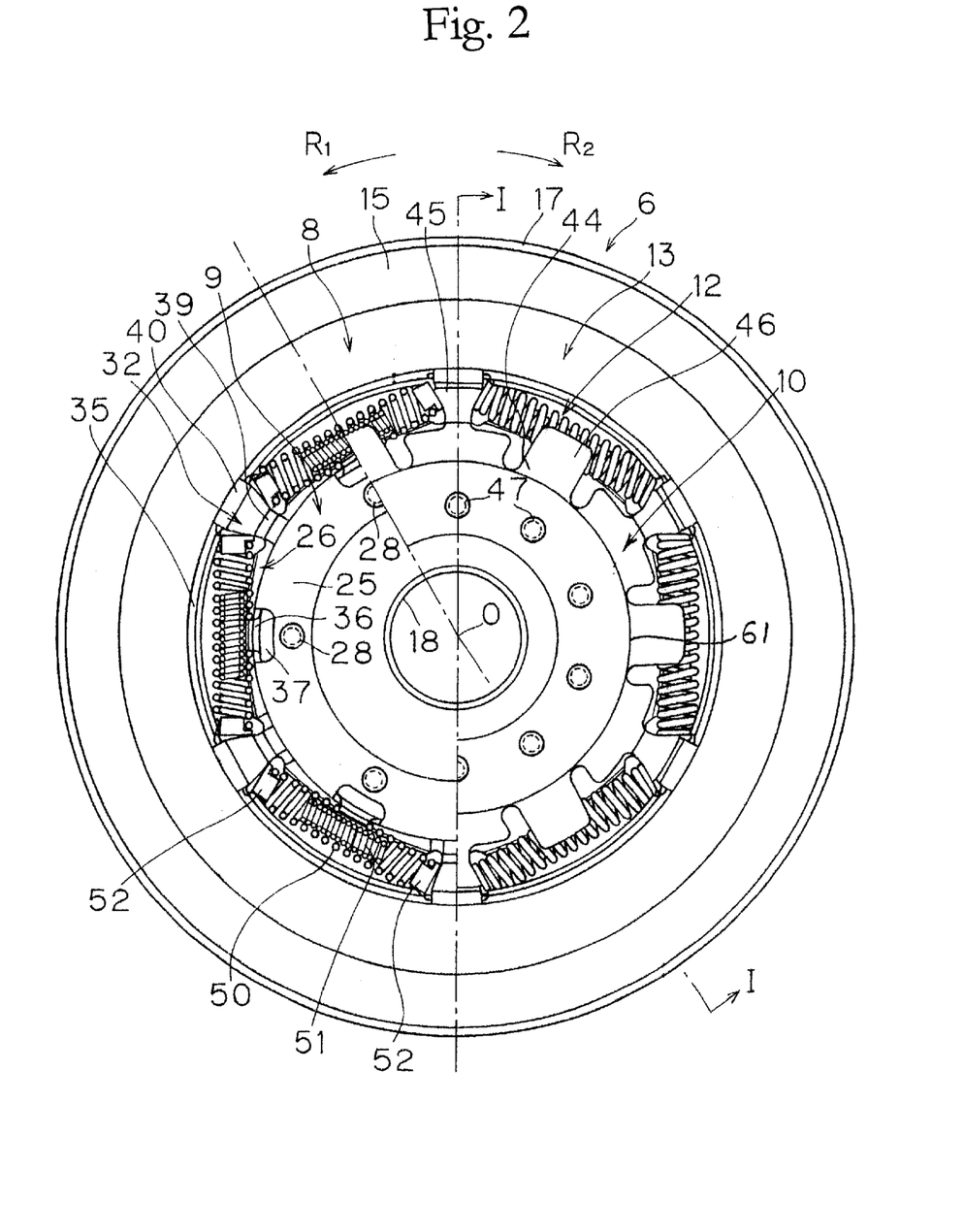
FIG. 2 is an elevational view of the lockup device illustrated in FIG. 1 in accordance with an embodiment of the present invention.

Referring initially to FIG. 1, a torque converter 1 is illustrated in a simplified longitudinal cross-sectional view of a torque converter 1 with a lockup device 6 in accordance with an embodiment of the present invention. With reference to FIG. 1, basically, the torque converter 1 includes a front cover 3, an impeller 4 and a turbine 5. The entire construction of the torque converter 1 is substantially similar to that of the prior art torque converters. Therefore, the torque converter 1 will not be described or illustrated in detail herein. An engine (not shown) is arranged on the left side of FIG. 1, and a transmission (not shown) is arranged on the right side of FIG. 1. A rotational axis of the torque converter 1 is indicated with a line O—O in FIG. 1. With reference to FIG. 2, an arrow R1 is a rotational direction of the engine, and an arrow R2 is a direction opposite to the rotational direction of the engine.

As seen in FIG. 1, the front cover 3 of the torque converter 1 is a disk-like member connected to a crankshaft of the engine. The front cover 3 and the impeller 4 define a hydraulic fluid chamber. The turbine 5 is arranged in the hydraulic fluid chamber and is axially opposed to the impeller 4. An inner peripheral section of the turbine 5 is connected to a turbine hub 11 that will be described later. The turbine hub 11 is in turn connected to a main drive shaft (not shown) of the transmission.

The turbine hub 11 is a cylindrical member. The turbine hub 11 includes a boss 60 and a disk-like flange 61 that is formed along an outer peripheral surface of the boss 60. A spline 62 is formed in an inner peripheral surface of the boss 60. The spline 62 forms a spline connection together with the main drive shaft arranged on the transmission side. An outer peripheral surface 63 is provided on the boss 60. The outer peripheral surface 63 is axially located on the engine side of the flange 61.

A lockup device 6 is a device that mechanically transmits torque from the front cover 3 to the turbine 5 while absorbing and dampening transmitted torsional vibrations. In other words, the lockup device 6 acts as a clutch and also as a damper. As shown in FIG. 1, the lockup device 6 is arranged in a space between the front cover 3 and the turbine 5. The lockup device 6 has an input member with a piston 8 as its major component, an output member with a driven plate 10 as its major component and a damper mechanism 13 arranged between the input member and the output member.

The input member basically includes the piston 8 and a drive plate 9. The piston 8 is axially movable in accordance with hydraulic pressure changes within the torque converter 1. The piston 8 is a disk-like member that is axially located adjacent to the transmission side surface of the front cover 3. The piston 8 has an annular friction coupling element 15 on its outer peripheral region. The friction coupling element 15 has an annular flat shape that is opposed to an annular flat friction surface of the front cover 3. An annular friction facing 16 is adhered to the friction coupling element 15 on the front cover side of the friction coupling element 15.

An outer peripheral tubular section 17 is formed on the outer peripheral region of the piston 8 to extend axially on the transmission side of the piston 8. An inner peripheral tubular section 18 is formed on the inner peripheral region of the piston 8 to extend axially on the transmission side of the piston 8. The inner peripheral tubular section 18 is radially supported by the outer peripheral surface 63 of the boss 60, such that the piston 8 is movable relative to the turbine hub 11 in an axial direction and also in a rotational direction.

A damper receiving section 19 is arranged at a radially middle point of the piston 8. The damper receiving section 19 is axially embossed to protrude on the engine side thereof, so that an annular recess is formed on the transmission side of the damper receiving section 19. More specifically, the damper receiving section 19 includes an outer peripheral tubular section 21, an axial support section 20 and an inner peripheral tubular section 22. The axial support section 20 is an annular flat plate section that extends inwardly from the inner peripheral side of the outer peripheral tubular section 21. The inner peripheral tubular section 22 axially extends from the axial support section 20.

The drive plate 9 is fixedly secured to the piston 8 for supporting the damper mechanism 13, which will be described later, in a rotational direction. The drive plate 9 is an annular plate member that is axially located on the transmission side of the piston 8. The drive plate 9 includes an annular section 25 arranged on its inner peripheral side and a spring support section 26 arranged on its outer peripheral side. The annular section 25 is secured to the piston 8 by a plurality of circumferentially distributed rivets 28 on the inner peripheral side of the damper receiving section 19.

The spring support section 26 is accommodated within the damper receiving section 19 located on the outer peripheral side of the annular section 25. An inner peripheral surface of the spring support section 26 is supported by an outer peripheral surface of the inner peripheral tubular section 22. An outer peripheral surface of the spring support section 26 is supported by an inner peripheral surface of the outer peripheral tubular section 21. An engine side surface of the spring support section 26 is supported by the transmission side surface of the axial support section 20.

Figure 5:
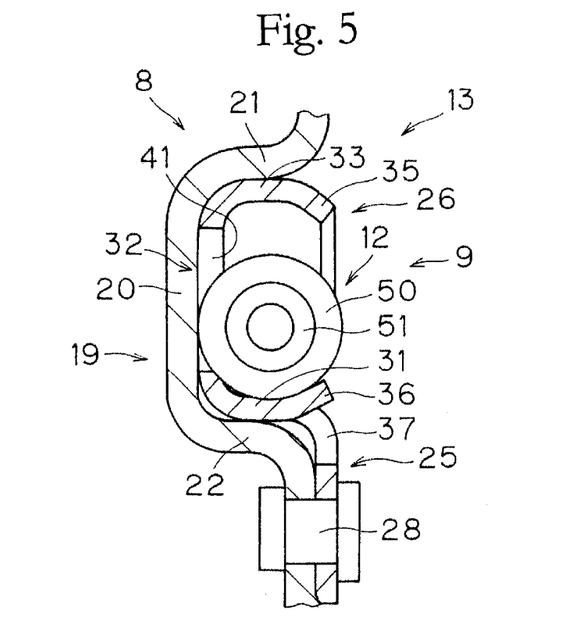
FIG. 5 is a partial, cross-sectional view of the lockup device illustrated in FIGS. 1–3 taken along section line V—V section line in FIG. 3.

More specifically, as best seen in FIG. 5, the spring support section 26 includes an inner peripheral tubular section 31, an annular section 32 and an outer peripheral tubular section 33. The inner peripheral tubular section 31 extends axially on the engine side of the spring support section 26 from an outer peripheral edge of the annular section 25. The annular section 32 extends radially outwardly from a distal end of the inner peripheral tubular section 31. The outer peripheral tubular section 33 extends axially on the transmission side of the spring support section 26 from an outer peripheral edge of the annular section 32. The inner peripheral tubular section 31 of the spring support section 26 is supported by the inner peripheral tubular section 22. The annular section 32 of the spring support section 26 is supported by the axial support section 20. The outer peripheral tubular section 33 of the spring support section 26 is supported by the outer peripheral tubular section 21 of the damper receiving section 19.

Figure 4:
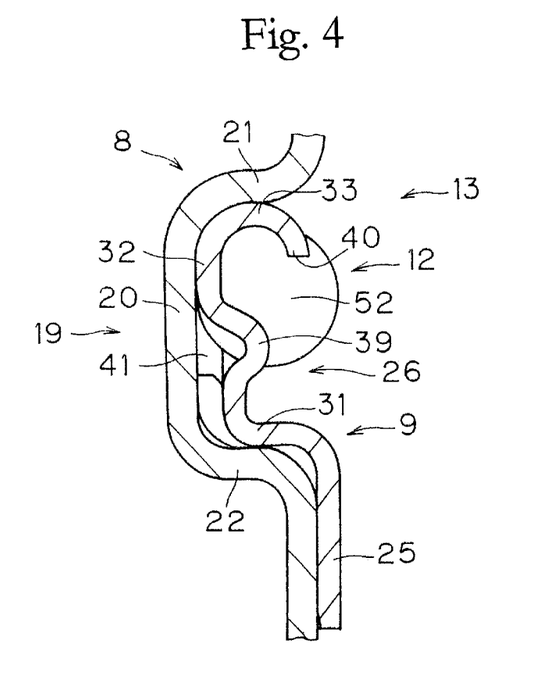
FIG. 4 is a partial, cross-sectional view of the lockup device illustrated in FIGS. 1–3 taken along section line IV—IV line in FIG. 3.

As shown in FIG. 5, a distal end of the outer peripheral tubular section 33 forms a bent section 35 that is bent obliquely toward the inner peripheral side. Furthermore, as shown in FIG. 4, in the bent section 35, first spring support sections 40 are provided in a circumferential direction at equal intervals and are further bent toward the inner peripheral side. Moreover, second spring support sections 39, which axially protrude on the transmission side, are provided in the annular section 32 in positions that correspond circumferentially with the positions of the first spring support sections 40.

Figure 3:
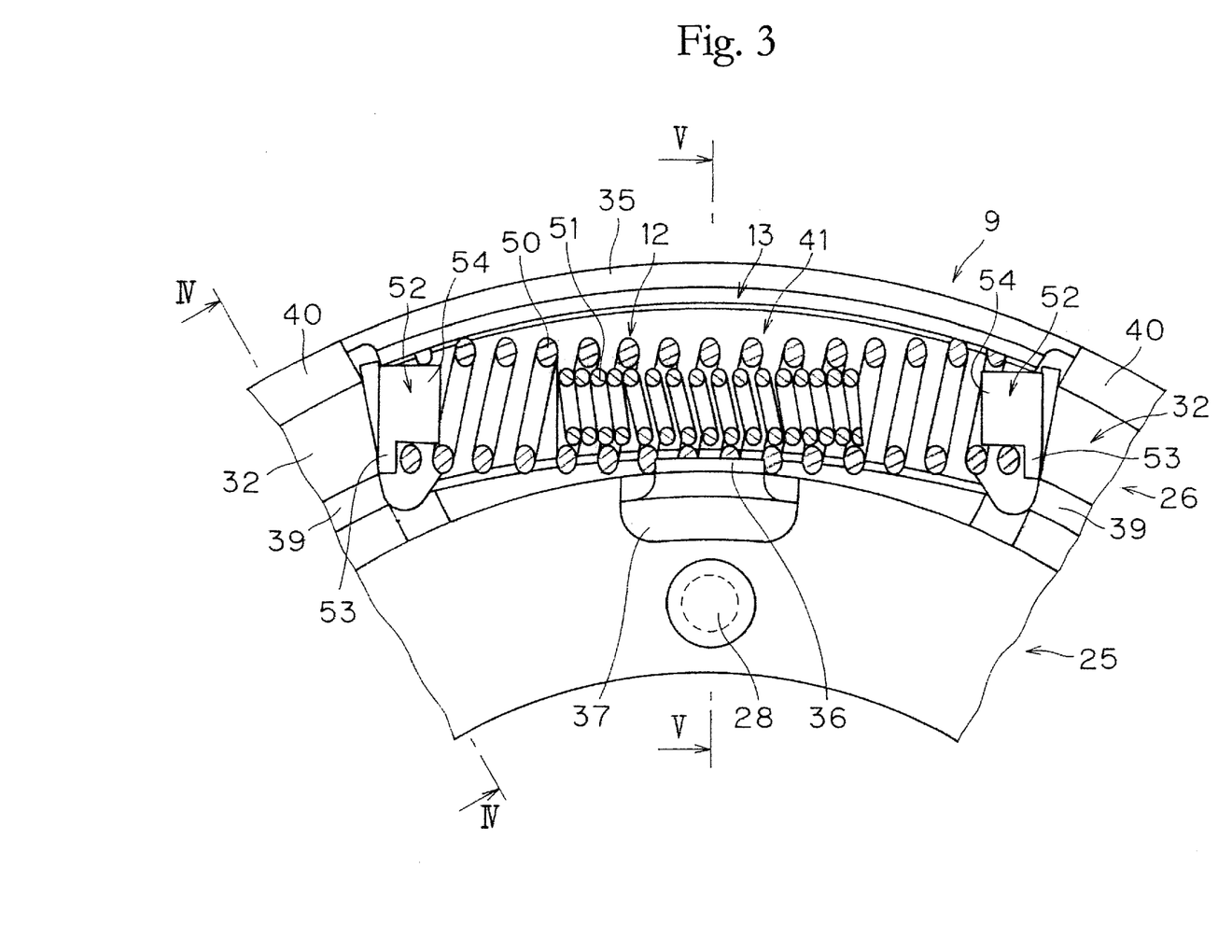
FIG. 3 is a partial, enlarged elevational view of the lockup device illustrated in FIG. 2 in accordance with an embodiment of the present invention.

A cut and bent section 36 is cut and then bent outwardly. As seen in FIG. 3, the cut and bent section 36 is arranged at a circumferentially middle position between each adjacent pair of the first spring support sections 40. Therefore, the cut and bent sections 36 are also between each adjacent pair of the second spring support sections 39 in the inner peripheral tubular section 31. Openings 37 are formed the cut and bent sections 36 are cut and then bent outwardly form the drive plate 9.

Figure 6:
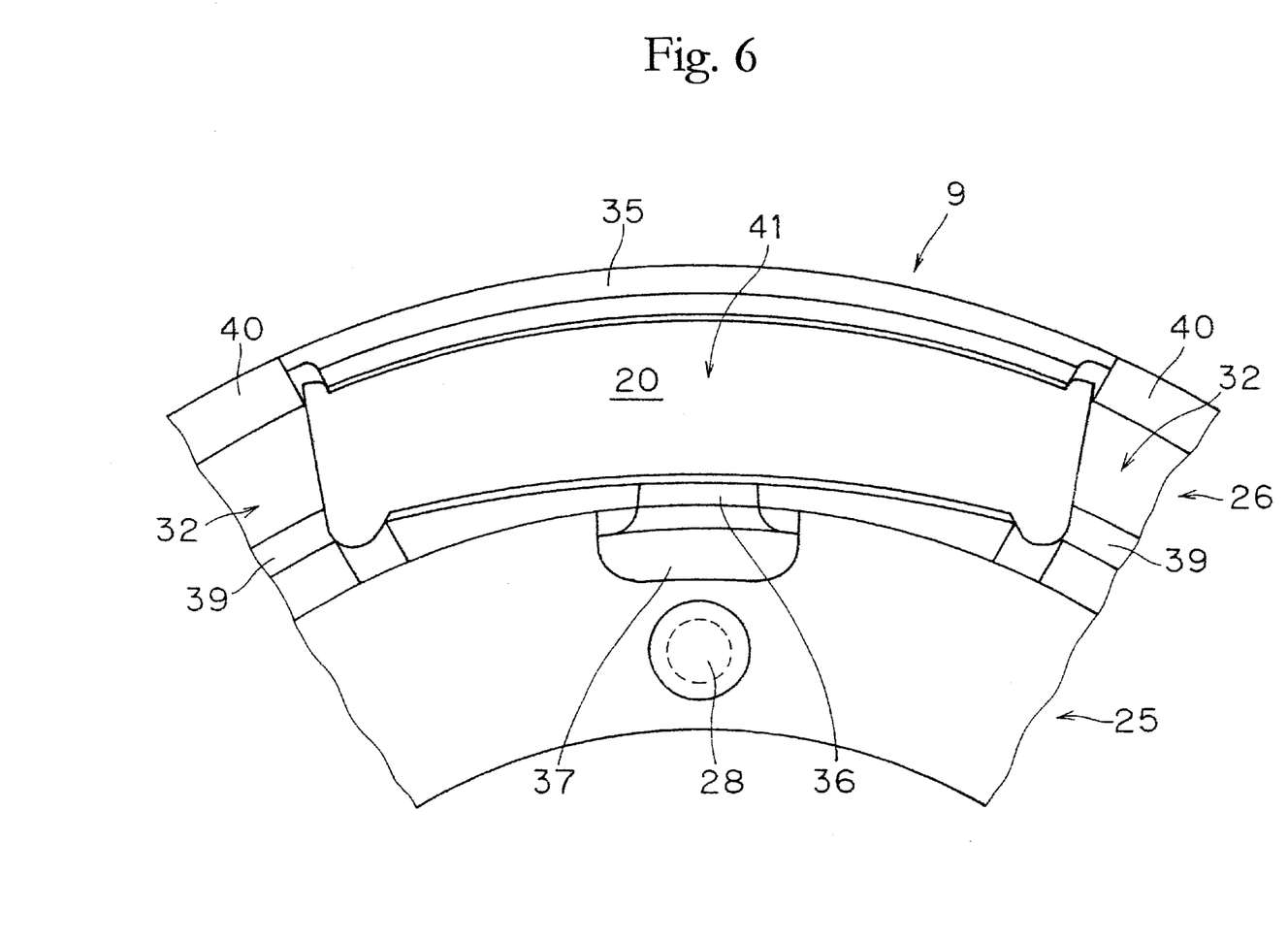
FIG. 6 is a partial, enlarged elevational view, similar to FIG. 3, of the lockup device illustrated in FIGS. 1–5 after removal of the coil spring assembly.

Furthermore, as shown in FIG. 6, a circumferentially extending cutout 41 is formed between each adjacent pair of the first spring support sections 40. The circumferentially extending cutouts 41 are therefore also located between each adjacent pair of the second spring support sections 39 in the annular section 32. In this way, a transmission side surface of the axial support section 20 is exposed through each cutout 41. The cutouts 41 as used herein apply to a through hole that is formed by punching out a portion of a continuous plate member and has a continuous surrounding edge around it. The cutouts 41 can be openings that are partially opened as desired.

Referring to FIG. 3, a coil spring assembly 12 is circumferentially arranged between each adjacent pair of the first spring support sections 40. The coil spring assemblies 12 are also arranged between each adjacent pair of the second spring support sections 39 in the drive plate 9. Each coil spring assembly 12 includes a larger coil spring 50, a smaller coil spring 51 and a pair of spring seats 52. The spring seats 52 are arranged at opposing circumferential ends of the coil springs 50 and 51.

The larger coil springs 50 are longer spring members than the coil springs 51. The larger coil springs 50 extend in a circumferential direction. Each larger coil spring 50 has opposing circumferential ends that are positioned adjacent to the corresponding first and second spring support sections 40 and 39, respectively.

The spring seats 52 are provided for supporting the opposing circumferential ends of the larger coil spring 50. Each spring seat 52 includes a seat section 53 and a protruding section 54. The seat section 53 supports the corresponding circumferential end of the larger coil spring 50. The protruding section 54 protrudes from the seat section 53 into the interior of the larger coil spring 50. The seat section 53 abuts circumferentially against the first and second spring support sections 40 and 39, respectively.

Parts of the larger coil springs 50 are arranged in the corresponding cutouts 41 of the drive plate 9. As seen in FIG. 5, the engine side of the larger coil spring 50 abuts against the transmission side surface of the axial support section 20 of the piston 8. The outer peripheral side of each circumferential end of the larger coil springs 50 is supported by the outer peripheral tubular section 33 and is restricted from axial movement toward the transmission side by the bent section 35. Furthermore, the circumferentially middle portion of the larger coil spring 50 is supported by the inner peripheral tubular section 31 and is restricted from axial movement toward the transmission side by the cut and bent section 36.

As seen in FIG. 3, the smaller coil springs 51 are arranged within the larger coil springs 50. The smaller coil springs 51 have a smaller coil diameter and also a smaller wire thickness in comparison to those of the larger coil springs 50. Therefore, there is a gap between each circumferential end of the smaller coil springs 51 and the corresponding spring seats 52 in a circumferential direction. That is, compression of the smaller coil springs 51 will not take place until the larger coil springs 50 have been compressed a certain amount.

Referring to FIG. 2, the piston 8, the drive plate 9 and the coil spring assemblies 12 constitute a piston mechanism that acts as a subassembly of the torque converter 1. The driven plate 10 is a member to which torque is transmitted from the piston 8 and the drive plate 9 via the coil spring assemblies 12.

Referring again to FIG. 1, the driven plate 10 includes an annular section 44, spring support sections 45 and protruding sections 46. The spring support sections 45 extend radially outwardly from the annular section 44. The annular section 44 is secured to the flange 61 by a plurality of circumferentially distributed rivets 47. Each spring support section 45 extends outwardly from the annular section 44.

As best seen in FIG. 2, each spring support section 45 supports the circumferential ends of the adjacent coil spring assemblies 12 that are circumferentially located adjacent to the spring support section 45. More specifically, as seen in FIGS. 1 and 4, each spring support section 45 is radially located between the corresponding outer peripheral tubular section 33 and the corresponding second spring support section 39.

Now referring to FIG. 2, each spring support section 45 has circumferential ends that abut the corresponding spring seats 52. Each protruding section 46 is circumferentially located between each pair of adjacent spring support sections 45 and extends to the corresponding coil spring assembly 12 on the transmission side of the coil spring assembly 12.

Operation of the lockup device 6 of the present invention will now be described. Referring to FIG. 1, as the hydraulic fluid is supplied to the inner peripheral regions of the front cover 3 and the piston 8 by a hydraulic system (not shown), the hydraulic fluid flows through a space between the front cover 3 and the piston 8 toward the outer peripheral regions of the front cover 3 and the piston 8. The hydraulic fluid flows further outwardly between the front cover 3 and the friction facing 16 and then flows into the main body of the torque converter through a space between an outlet of the front cover 3 and an inlet of the turbine 5. At this point, the entire piston mechanism is shifted on the transmission side in an axial direction, and the clutch is uncoupled at the friction coupling element 15.

As the hydraulic fluid flows out from a space between the front cover 3 and the piston 8 by the action of the hydraulic system (not shown), the entire piston mechanism is shifted toward the engine side in an axial direction, such that the friction facing 16 is strongly urged against the front cover 3 to couple the clutch. Torque from the front cover 3 is then transmitted to the damper mechanism 13 through the piston 8.

In the damper mechanism 13, the torque is transmitted from the drive plate 9 to the driven plate 10 through the coil spring assemblies 12. The torque is then transmitted from the driven plate 10 to the shaft (not shown) through the turbine hub 11. As best seen in FIG. 2, if the torque fluctuations are transmitted from the engine side while the clutch is coupled, the coil spring assemblies 12 are compressed in a rotational direction between the drive plate 9 and the driven plate 10 in the damper mechanism 13. More specifically, each larger coil spring 50 and each smaller coil spring 51 are compressed in a rotational direction between the corresponding first and second spring support sections 40 and 39 of the drive plate 9 and the corresponding spring support section 45 of the driven plate 10. In this state, each larger coil spring 50 is urged outwardly due to the centrifugal force and also slides along the drive plate 9 and the piston 8.

As seen in FIGS. 4 and 5, the outer peripheral section of the larger coil spring 50 is directly supported by the outer peripheral tubular section 33. The load from the coil spring assembly 12 is received by the outer peripheral tubular section 21. Furthermore, as seen in FIGS. 1 and 3, the larger coil spring 50 slides directly along the transmission side surface of the front cover 3 within the corresponding cutout 41.

As described above, with the cutouts 41 newly provided in the prior art drive plate 9 in positions corresponding to the positions of the coil springs 50, each coil spring diameter can be increased in comparison to that of the prior art. Therefore, better designing of the larger and smaller coil springs 50 and 51 can be facilitated and higher functions such as lower rigidity can be achieved.

The present invention is not limited to the described embodiment. For example, it is possible to adapt the lockup device 6 such that the damper mechanism is arranged on one side of the friction coupling element 15 of the piston 8. It is also possible to adapt the lockup device 6 to be part of a clutch coupler with a plurality of friction surfaces.

In summary, in the lockup device 6 of the torque converter 1 in accordance with the present invention cutouts 41 are provided in the drive plate 9 so that it is possible to increase each torsion spring diameter. The diameter of each torsion spring 50 can be increased in accordance with the thickness of the drive plate 9. This increase was not possible for corresponding torsion springs of prior art lockup devices.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:
    a disk-shaped piston adapted to move within the space in accordance with pressure changes in the space, and adapted to be arranged adjacent to the friction surface of the front cover; and
    a damper mechanism arranged at a substantially radially midpoint of said piston, said damper mechanism arranged to elastically couple said piston and the turbine in a rotational direction, said damper mechanism including a drive plate secured to one axial side surface of said piston, a driven plate adapted to be relatively nonrotatably engaged with the turbine and at least one torsion spring elastically coupling said drive plate and said driven plate in a rotational direction,
        said drive plate having a cutout formed at a position corresponding to a position of said torsion spring, and said torsion spring being axially supported by said one axial side surface of said piston within said cutout.

2. A lockup device according to claim 1, wherein said driven plate supports both circumferential ends of said torsion spring in a manner that allows axial movement of said piston, said drive plate and said torsion spring relative to said driven plate.

3. A lockup device according to claim 1, wherein said damper mechanism includes a plurality of said torsion springs, and said drive plate having a plurality of said cutouts formed at a position corresponding to a position of said torsion springs.

4. A lockup device according to claim 1, wherein said piston has an annular recess that receives a portion of said drive plate and said torsion springs therein.

5. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:
    a disk-shaped plate member adapted to receive torque from the front cover; and
    a damper mechanism arranged at a substantially radially midpoint of said plate member, said damper mechanism arranged to elastically couple said plate member and said turbine in a rotational direction, said damper mechanism including a drive plate secured to one axial side surface of said plate member, a driven plate adapted to be relatively nonrotatably engaged with the turbine and a torsion spring elastically coupling said drive plate and said driven plate in a rotational direction,
        said drive plate having a cutout formed at a position corresponding to a position of said torsion spring, said torsion spring being axially supported by said one axial side surface of said plate member within said cutout.

6. A lockup device according to claim 5, wherein said damper mechanism includes a plurality of said torsion springs, and said drive plate having a plurality of said cutouts formed at a position corresponding to a position of said torsion springs.

7. A lockup device according to claim 5, wherein said plate member has an annular recess that receives a portion of said drive plate and said torsion springs therein.

8. A torque converter adapted to be used to transmit torque from a power input shaft to an output shaft, said torque converter comprising:
    a front cover being adapted to be coupled to the power input shaft, said front cover being provided at an inner side with a friction surface;
    an impeller connected to said front cover to form a hydraulic chamber together with said front cover;
    a turbine disposed opposite said impeller and disposed inside said hydraulic chamber, said turbine being adapted to be coupled to the output shaft, said front cover and said turbine forming a space therebetween; and
    a lockup device disposed in said space for mechanically engaging and disengaging said front cover with respect to said turbine, said lockup device including
        a disk-shaped piston adapted to move within the space in accordance with pressure changes in the space, and adapted to be arranged adjacent to the friction surface of the front cover, and
        a damper mechanism arranged at a substantially radially midpoint of said piston, said damper mechanism arranged to elastically couple said piston and the turbine in a rotational direction, said damper mechanism including a drive plate secured to one axial side surface of said piston, a driven plate adapted to be relatively nonrotatably engaged with the turbine and a torsion spring elastically coupling said drive plate and said driven plate in a rotational direction, said drive plate having a cutout formed at a position corresponding to a position of said torsion spring, and said torsion spring being axially supported by said one axial side surface of said piston within said cutout.

9. A torque converter according to claim 8, wherein said driven plate supports both circumferential ends of said torsion spring in a manner that allows axial movement of said piston, said drive plate and said torsion spring relative to said driven plate.

10. A torque converter according to claim 8, wherein said damper mechanism includes a plurality of said torsion springs, and said drive plate having a plurality of said cutouts formed at a position corresponding to a position of said torsion springs.

11. A torque converter according to claim 8, wherein said piston has an annular recess that receives a portion of said drive plate and said torsion springs therein.

* * * * *